Sept. 20, 1955 C. W. R. WINTER 2,718,442
BEARINGS OF DRAFTING ROLLERS FOR SPINNING MACHINES
Filed July 27, 1951
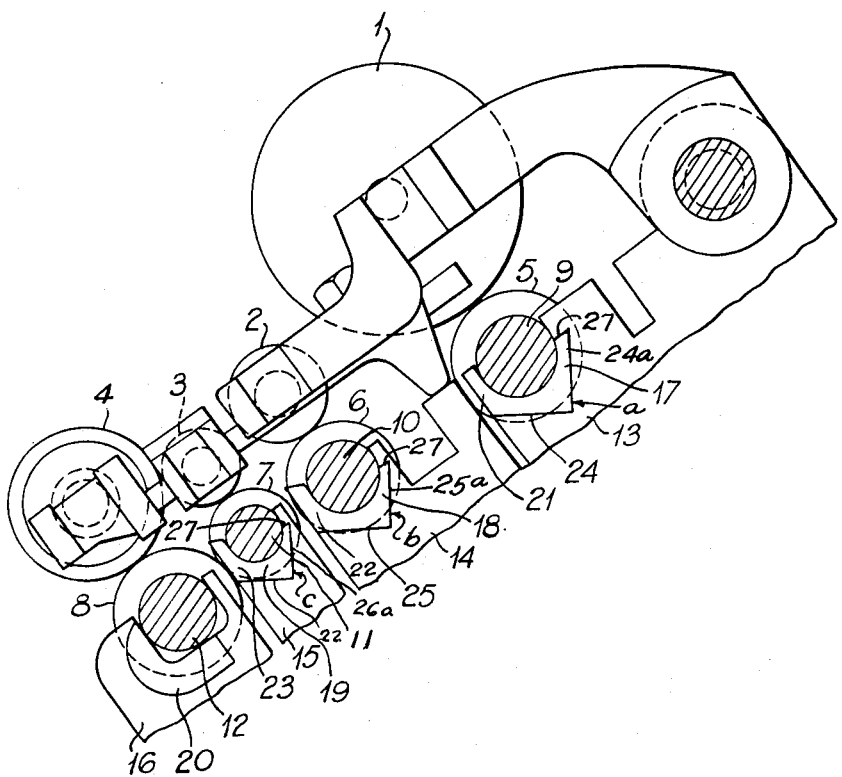
Inventor:
Charles William Ronald Winter
By his attorneys,
Baldwin & Wight United States Patent Office 2,718,442
Patented Sept. 20, 1955

2,718,442

BEARINGS OF DRAFTING ROLLERS FOR SPINNING MACHINES

Charles William Ronald Winter, Sandwich, England, assignor to The Morgan Crucible Company, Limited, Battersea Works, London, England, a company of Great Britain Application July 27, 1951, Serial No. 238,888

Claims priority, application Great Britain July 28, 1950

3 Claims. (Cl. 308—237)

This invention relates to bearings which support the drafting rollers of cotton, woolen and synthetic fibres spinning machines.

In the customary methods of supporting the drafting rollers of spinning machines, the axle ends of the rollers are supported in metal bearings or housings formed in a roller stand. These methods have the disadvantage that considerable damage to the material passing through the rollers is caused by the oil, which lubricates the bearings, spreading along the rollers and coming into contact with the fibres. The weighting of the upper rollers required to control the fibres as they pass through the rollers has, moreover, caused appreciable wear in the bearings of the lower rollers, and when this wear has become such as to need correction it has been necessary to replace the entire roller stand.

It has been proposed in British Patent No. 617,809 to provide the bearings or housings supporting the roller axles with replaceable sintered metal inserts slidably fitted in dove-tailed recesses in the bearings, such inserts being made from sintered ferrous or non-ferrous metals and being porous or non-porous. If the inserts are porous they are impregnated with a lubricant such as oil which is retained in the pores of the insert. With non-porous inserts, a lubricant such as graphite is added to the metal before sintering.

These features of the prior art have overcome the above-mentioned disadvantages to the extent that with such inserts there is no free oil to spread along the rollers and damage the fibres. Moreover, the bearing wear is largely taken on the inserts, thus making the life of the roller stand considerably longer and making it unnecessary to replace the entire member in order to correct the bearing wear.

In the case, which is frequent, where the roller stand is inclined at a substantial angle to the horizontal and where the side load that is to be carried is substantial, and where the center distance between respective roller bearings leaves insufficient space to provide a supporting side wall from the housing for the bearing insert, there is considerable side thrust on the bearing due to gravity in addition to the reaction to the driving force, and an object of the present invention is to provide a suitable form of bearing insert to take such thrust without a supporting shoulder from the housing.

According to the invention, a bearing for a drafting roller axle of a spinning machine comprises one or more of the housings of the roller stand thereof having a recess at one upper corner thereof, preferably of substantially dovetailed shape at a portion thereof, and a sintered metal generally U-shaped in cross-section insert mounted in said recess and comprising an axle-retaining limb which projects away from said recess, beyond contact with the housing and in line with the adjacent side thereof, and another limb engaged at its free end by an overhanging shoulder of the housing. The bearing surface of the insert is preferably shaped to match the cylindrical form of the roller axle, but it may comprise a plurality of plane surfaces suitably inclined to receive the thrust.

The insert according to the present invention, has the advantage, besides being robust but simple in shape and easy to fit, of providing a large bearing surface. Moreover, the pressure between the insert and the housing due to the load on the roller axle may be borne by a face of the insert or housing more or less normal to the load so as to tend to keep the insert in position or to put only a small strain on the dove-tail anchorage of the insert in the housing recess. In the inclined set-up of the roller stand, the main part of the load is in a vertical direction, and therefore it is desirable that a vertical line passing through the axis of the roller axle passes through a portion of the housing, and that such line is substantially perpendicular to a face of the recess of the housing.

The accompanying drawing is an end view, partly in section, of the essential parts of a drafting roller system of a spinning machine, in which certain bearings or housings according to the invention are incorporated.

Referring to the drawing, the upper rollers of the drafting system of the roller stand are indicated by the reference numerals 1, 2, 3 and 4, and the corresponding lower rollers by reference numerals 5, 6, 7 and 8. The axles of the lower rollers are shown in section respectively numbered 9, 10, 11 and 12. These axles of the lower rollers are mounted in bearings comprising housings 13, 14, 15 and 16, having recesses in which are snugly accommodated sintered metal inserts 17, 18, 19 and 20. Said recesses of housings 13, 14 and 15 are designated $a$, $b$, $c$, respectively, and are cut away in V-shape to provide walls or surfaces 24—24$^a$, 25—25$^a$, and 26—26$^a$, and a short shoulder 27 at the top of each wall 24$^a$, 25$^a$, and 26$^a$, extending toward walls 24, 25 and 26 in converging relation to the walls 24, 25 and 26 to form dovetails.

These inserts are longitudinally slidable in their respective housing recess so that they may be removed and replaced as desired.

The insert 20 is of general L-shape and is not in accordance with the present invention because, as will be noted, it is completely housed within its recess and has no limb projecting away from the recess. It is substantially the same as the insert of the front or forward bearing shown in British Patent No. 617,809.

The remaining inserts 17, 18 and 19 are, however, formed and housed in accordance with the present invention and it will be noted that each of these inserts has a limb 21, 22 or 23 respectively which projects away from the recess in extension of a side of the coacting housing and which serves to retain the axle 9, 10 or 11 in its bearing. The general disposition of the drafting roller system, being inclined at a substantial angle to the horizontal, the axles 9, 10 and 11 would tend to fall forwardly and downwardly out of their bearings were it not for the axle-retaining limbs 21, 22 and 23 and the abutment of the other limbs of the inserts at shoulders 27.

Each of the inserts 17, 18 and 19, it will be realized is partially formed with a dovetail as will be noted by observing the right hand dovetail in view of said shoulders 27. The housing recesses are correspondingly partially dovetailed to confine the inserts in their housings. The bearing surfaces of the inserts 17, 18 and 19 match the cylindrical forms of the respective roller axles 9, 10 and 11.

The load transmitted from the axles 9, 10 and 11 upon their bearings or housings is mainly vertically downwards, and it will be noted that vertical lines through the centres of these axles are substantially perpendicular to faces 24, 25 and 26 and pass through a portion of the housing. As a result there is only a minor load or side thrust upon the unsupported limbs 21, 22 and 23, the main thrust being transmitted to the bearing housings at the walls or surfaces 24, 25 and 26, and there is no undue strain imposed on the partial dovetail anchorages of the inserts in their housing recesses.

The bearing arrangement accordingly provides in a satisfactory manner for sintered metal inserts to take the whole of the thrust in the several bearings or housings of the roller stand, and thus achieves the object of the present invention.

I claim:

1. In a drawing frame for a spinning or like machine having a roller stand provided with a housing, said housing at an upper corner thereof being recessed inwardly from one side portion, said housing above the base of the recess and inwardly from said side portion having a shoulder extending partly across the recess, said shoulder and wall of the recess opposite the same substantially defining a dovetail, and a metal insert slidably fitted in said recess and being substantially U-shaped in cross-section and exteriorly shaped in conformity with the walls of the recess, the upper surface of said insert having spaced-apart limbs rising therefrom, said insert between said limbs being shaped to journal a drafting roller axle, said shoulder overlapping one of said limbs and the other limb being in line with said side portion and in effect forming an upward extension thereof.

2. In a drawing frame for a spinning or like machine having a roller stand provided with a housing according to claim 1, wherein said wall of the recess opposite the shoulder is substantially horizontal and extends inwardly from said side portion.

3. In a drawing frame for a spinning or like machine having a roller stand provided with a housing according to claim 1, the insert being of sintered metal and in its upper surface between the limbs being cylindrical to conform to the drafing roller axle.

References Cited in the file of this patent

UNITED STATES PATENTS

| | | |
|---|---|---|
| 1,089,381 | Rhoades | Mar. 3, 1914 |
| 1,124,986 | Widdup | Jan. 12, 1915 |
| 2,446,021 | Noguera | July 27, 1948 |

FOREIGN PATENTS

| | | |
|---|---|---|
| 14,666 | Great Britain | 1887 |
| 617,809 | Great Britain | Feb. 11, 1949 |